2,988,426
METHOD FOR PRODUCING POLYMERIC PHOSPHORUS PENTOXIDE
John W. Cross, Warson Woods, William F. Tucker, Creve Coeur, and Harry E. Ulmer, Brentwood, Mo., assignors to Monsanto Chemical Company, St. Louis, Mo., a corporation of Delaware
No Drawing. Filed Oct. 8, 1957, Ser. No. 688,819
5 Claims. (Cl. 23—165)

This invention relates to a method for making polymeric phosphorus pentoxide—i.e., a polymeric oxide of phosphorus having the empirical formula $P_2O_5$.

Phosphorus pentoxide is known to exist in a number of crystalline and amorphous forms. The most common form is often designated as the H-form, which is a crystalline solid at room temperature, exhibiting a triple point at about 360 cm. Hg and about 420° C. The H-form of phosphorus pentoxide consists of individual $P_4O_{10}$ molecules in which each phosphorus atom is tetrahedrally bonded to four neighboring oxygen atoms. This $P_4O_{10}$ molecule is the simplest known combination of pentavalent phosphorus and oxygen and will be spoken of herein as the monomeric form of phosphorus pentoxide. Electron diffraction studies have shown that phosphorus pentoxide vapor also consists of monomeric $P_4O_{10}$ molecules.

Phosphorus pentoxide exists in two other crystalline forms, often designated as O and O', both forms of which are polymeric. Polymeric phosphorus pentoxide also exists in at least two amorphous forms, designated as the beta and gamma forms. Further details of these various forms are set forth in such prior art as the "Encyclopedia of Chemical Technology," volume X, pages 483–488, Interscience Encyclopedia, Inc. (1953).

For some purposes the polymeric forms of phosphorus pentoxide are more desirable than the monomeric form. For example, the polymeric forms have a lower vapor pressure than the monomeric form, thereby making the former more convenient to deal with under elevated temperature conditions. Another advantage of at least some of the polymeric forms (particularly the O-form) is that dissolution in water takes place slowly and quietly, whereas the monomeric form dissolves only with rapid and violent evolution of noise and heat.

The principal way in which polymeric phosphorus pentoxides have been made in the past is by heating the monomeric solid phosphorus pentoxide to an elevated temperature (e.g. about 500° C.), whereupon the phosphorus pentoxide goes through a condensed phase transition from the monomeric to the polymeric form. However, because of the relative high vapor pressure of the monomeric phosphorus pentoxide, the foregoing prior art method of making polymeric phosphorus pentoxide is carried out under superatmospheric pressure, as in an autoclave. Formation of polymeric phosphorus pentoxide by transfer of the monomeric $P_4O_{10}$ molecules through an intermediate vapor phase has been reported (Journal of the American Chemical Society 65, pages 794–802 (1943)), but this formation was carried out under the conditions which gave only a very small and very slow yield of polymeric phosphorus pentoxide.

We have now found a greatly improved method for the expeditious and economical production of polymeric phosphorus pentoxide. This method is carried out by introducing phosphorus pentoxide vapors into a condensation-polymerization zone maintained at a temperature greater than about 385° C. and containing a catalytic amount (hereinafter specified) of water vapor. The incoming phosphorus pentoxide vapors are introduced at a temperature somewhat above the average temperature of the condensation-polymerization zone and, upon cooling to the lower temperature, are precipitated in said zone in the form of solid polymeric phosphorus pentoxide.

The temperature of the condensation-polymerization zone must be maintained higher than about 385° C. This zone is preferably maintained at a temperature above about 400° C., such as between about 410° C. and about 430° C. If the temperature is allowed to rise much above 470° C., the equilibrium between polymeric product and vapor phase $P_4O_{10}$ will be such that the efficiency of recovery of phosphorus pentoxide from the vapor may become prohibitively low.

The monomeric $P_4O_{10}$ vapors must be introduced into the condensation-polymerization zone at a temperature somewhat in excess of the average temperatures of that zone. The vapors are preferably introduced at a temperature in excess of 470° C., but in any event at a temperature at least 10° C. higher than the average temperature of the condensation-polymerization zone.

The condensation-polymerization of the present invention must be water-catalyzed. Without the catalyst the condensation-polymerization reaction may take days or even weeks—whereas the same degree of condensation-polymerization will take place in a matter of seconds with the proper amount of water catalysis. The catalyst concentration in the condensation-polymerization zone must be greater than about 0.08 grain of water per cubic foot of condensation-polymerization zone volume. Although the effectiveness of the catalysis increases with higher catalyst concentrations, there is relatively little additional benefit gained at catalyst concentrations greater than about 5 grains per cubic foot. If unnecessarily high concentrations of water are utilized there is a strong tendency for the excess water to react with the phosphorus pentoxide to form metaphosphoric acids, which are generally considered undesirable contaminants of the polymeric phosphorus pentoxide. In view of the foregoing, preferred catalyst concentrations will generally run between about 0.2 and about 2 grains per cubic foot.

The phosphorus pentoxide vapors to be introduced into the condensation-polymerization zone can be obtained or prepared in any one or more several different ways which will be immediately apparent to those skilled in the art. For example, phosphorus pentoxide can be vaporized directly into a heated stream of an inert gas (i.e., inert to reaction with phosphorus pentoxide) such as nitrogen, oxygen, argon, helium, etc. An even simpler way to obtain the heated phosphorus pentoxide vapor is to burn elemental phosphorus in air, oxygen-enriched air, or oxygen. The concentration of $P_4O_{10}$ vapors in the incoming gas stream is of importance to the extent that the concentration should generally not exceed the dew point of the hot gas mixture at the particular inlet temperature. If this dew point concentration is exceeded, there is danger of precipitating polymeric phosphorus pentoxide before the inlet gases reach the condensation-polymerization zone. This is particularly true if the water catalyst is added to the gas stream prior to introduction into the condensation-polymerization zone.

On the other hand, the concentration of $P_4O_{10}$ vapor in the incoming gas should not be too low or else it will be difficult to effect an efficient and economical recovery of the phosphorus pentoxide from the vapor stream. When air is used to burn elemental phosphorus in producing the phosphorus pentoxide vapors, a stoichiometric amount of air (based on production of $P_4O_{10}$) will give a vapor containing about 5 volume percent of phosphorus pentoxide. Actual phosphorus combustion processes are generally carried out with an excess of air (for example, about 50% excess), thereby giving combustion gases containing about 3% by volume of phosphorus pentoxide vapor. Such a gas will have a dew point of about 460° C.

The condensation-polymerization of the present invention can be carried out in numerous different types of apparatus and utilizing various different processing techniques. For example, the process can be carried out either batchwise or in a continuous steady state operation. Typical ways in which these latter processes can be carried out are (1) by using rotary condensers (with either countercurrent or cocurrent flow of solids and gases) or (2) by using fluidized solid beds. In either case, a bed of the solid precipitated polymeric phosphorus pentoxide is provided in the condensation-polymerization zone and the polymerized solids are then removed at approximately the same rate as new solids are produced by condensation and polymerization from the gaseous phase phosphorus pentoxide. This latter type of operation is particularly advantageous in that there appears to be a beneficial nucleation effect from having the previously formed polymeric phosphorus pentoxide solids in intimate contact with the phosphorus pentoxide vapors.

Under some circumstances it may also be advantageous to furnish additional solid surfaces for the polymeric phosphorus pentoxide to nucleate and precipitate upon. For example, extraneous solids such as metal shot or porcelain pellets may be introduced into a calciner of fluidized solid bed, and the polymeric phosphorus pentoxide formed upon the surfaces thereof. These coated solids can then be removed from the beds, the polymeric phosphorus pentoxide removed therefrom, and the solids recycled back into the condensation-polymerization zone.

On the other hand, it is not completely necessary that there be any extraneous solid surface involved in the condensation-polymerization zone. For example, the heated phosphorus pentoxide vapors can be introduced into a condensation-polymerization zone of very large volume (such as the so-called "barn" used in present commercial production of H-form $P_2O_5$) and appropriately cooled by expansion or dilution with cooler inert gases. Under said circumstances the polymeric phosphorus pentoxide will precipitate essentially within the gas stream and slowly settle out by gravity.

The term "average temperature of the condensation-polymerization zone" as used in this specification should be understood as the average temperature (averaged with respect to time and/or space) in that part of the apparatus or equipment in which the condensation and/or polymerization is taking place. Likewise, the condensation-polymerization zone should be understood to be that portion of the process in which condensation and/or polymerization takes place.

The following example serves to illustrate further details of operation of the present invention as well as the benefits gained therefrom.

*Example*

A mechanically agitated bed of crystalline polymeric phosphorus pentoxide was maintained at a temperature of about 425° C. while hot gaseous nitrogen containing $P_4O_{10}$ vapors was passed downwardly through the bed at a superficial gas velocity of about 68 centimeters per minute, resulting in a contact time of about 1.5 seconds. The partial pressure of $P_4O_{10}$ in the incoming gas was approximately 30 mm. Hg. The partial pressure of water vapor in the incoming gas was about 0.9 mm. Hg (0.4 grain per cubic foot). The incoming gas stream was introduced at about atmospheric pressure. The gas temperature was maintained at about 475° C.

Polymeric phosphorus pentoxide was formed in the agitated bed in an amount corresponding to a recovery of better than 93% of that theoretically possible at the bed temperature and gas concentration utilized.

When the above-described procedure was repeated under the same conditions except that the agitated bed temperature was maintained at about 380° C., no solid phosphorus pentoxide whatsoever (either polymeric or monomeric) was collected in the bed.

What is claimed is:
1. A method of making polymeric phosphorus pentoxide, which comprises introducing $P_4O_{10}$ vapors into a condensation-polymerization zone maintained at a temperature greater than about 385° C., said vapors being introduced into said zone at a temperature at least 10° C. higher than the average temperature of said zone, and condensing polymeric phosphorus pentoxide in said zone in the presence of water in a catalytic concentration of at least 0.08 grain per cubic foot of said zone volume.

2. A method of making polymeric phosphorus pentoxide, which comprises introducing $P_4O_{10}$ vapors into a condensation-polymerization zone maintained at a temperature greater than about 400° C., said vapors being introduced into said zone at a temperature at least 10° C. higher than the average temperature of said zone, and condensing polymeric phosphorus pentoxide in said zone in the presence of between about 0.08 and about 5 grains of water per cubic foot of said zone volume.

3. A method of making polymeric phosphorus pentoxide, which comprises introducing $P_4O_{10}$ vapors into a condensation-polymerization zone maintained at a temperature between about 410° C. and about 430° C., said vapors being introduced into said zone at a temperature greater than about 470° C., and condensing polymeric phosphorus pentoxide in said zone in the presence of between about 0.2 and about 2 grains of water per cubic foot of said zone volume.

4. A method of making polymeric phosphorus pentoxide, which method comprises burning elemental phosphorus in air to produce a gaseous mixture containing $P_4O_{10}$ vapors, introducing said gaseous mixture into a condensation-polymerization zone maintained at a temperature between about 410 and 430° C., said gaseous mixture being introduced into said zone at a temperature greater than about 470° C., and condensing polymeric phosphorus pentoxide in said zone in the presence of between about 0.2 and about 2 grains of water per cubic foot of said zone volume.

5. A method of making polymeric phosphorus pentoxide, which method comprises introducing polymeric phosphorus pentoxide into a condensation-polymerization zone maintained at a temperature above about 400° C., burning elemental phosphorus in air to produce a gaseous mixture containing $P_4O_{10}$ vapors, introducing said gaseous mixture into said zone at a temperature at least 10° C. higher than the average temperature of said zone, and condensing polymeric phosphorus pentoxide in said zone in the presence of between about 0.2 and about 2 grains of water per cubic foot of said zone volume.

References Cited in the file of this patent

Encyclopedia of Chemical Technology, vol. 10, 1953, pages 483–486.